United States Patent
Ogawa et al.

(10) Patent No.: US 7,428,616 B2
(45) Date of Patent: Sep. 23, 2008

(54) METHOD AND APPARATUS FOR APPENDING BUFFER AREAS TO REQUESTED MEMORY

(75) Inventors: Takeshi Ogawa, Tokyo (JP); Takeo Sakimura, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 11/044,171

(22) Filed: Jan. 28, 2005

(65) Prior Publication Data

US 2005/0172081 A1 Aug. 4, 2005

(30) Foreign Application Priority Data

Feb. 2, 2004 (JP) .............................. 2004-025349

(51) Int. Cl.
*G06F 12/12* (2006.01)
*G06F 12/00* (2006.01)

(52) U.S. Cl. ................. 711/129; 711/118; 711/135; 711/154; 711/170

(58) Field of Classification Search ................. 711/135; 71/135, 118, 129, 154, 170
See application file for complete search history.

(56) References Cited

U.S. PATENT DOCUMENTS

| | | | |
|---|---|---|---|
| 5,933,847 A | 8/1999 | Ogawa | 711/103 |
| 6,115,799 A | 9/2000 | Ogawa | 711/171 |
| 6,470,413 B1 | 10/2002 | Ogawa | 711/103 |
| 6,604,168 B2 | 8/2003 | Ogawa | 711/103 |
| 6,772,421 B2 | 8/2004 | Ogawa | 719/331 |
| 2004/0107329 A1* | 6/2004 | Krejsa | 711/173 |
| 2004/0221120 A1* | 11/2004 | Abrashkevich et al. | 711/170 |
| 2004/0225857 A1 | 11/2004 | Ogawa | 711/170 |
| 2005/0091459 A1* | 4/2005 | Quach et al. | 711/141 |
| 2005/0160234 A1* | 7/2005 | Newburn et al. | 711/144 |

\* cited by examiner

*Primary Examiner*—Stephen C. Elmore
*Assistant Examiner*—Daniel Tsui
(74) *Attorney, Agent, or Firm*—Fitzpatrick, Cella Harper & Scinto

(57) ABSTRACT

An information processing apparatus has a CPU, a memory, a cache memory and a cache controller. When an acquisition of an area of a prescribed size is requested in the memory, a size equivalent to at least two lines serving as a cache unit is added to the prescribed size requested and this area is reserved in the memory. The area reserved is allocated to an uncacheable memory area of this memory.

6 Claims, 6 Drawing Sheets

METHOD AND APPARATUS FOR APPENDING BUFFER AREAS TO REQUESTED MEMORY

FIELD OF THE INVENTION

This invention relates to an information processing apparatus and method having a cache function.

BACKGROUND OF THE INVENTION

When an inexpensive, large-capacity DRAM is utilized as the main memory of a microcomputer, it is possible to design an internal bus within a CPU chip at a speed higher than that of an external bus that connects to the DRAM. By raising the clock of the CPU internal bus and designing the CPU circuit, the processing capability of the computer system equipped with such a CPU can be improved. In such a computer system, a cache memory is generally interposed between the internal bus and the external bus in order that memory access from the CPU to the external bus will be performed efficiently.

Since such a cache memory resides between the internal bus of the CPU and the external bus, the cache memory is transparent as viewed from the CPU side. However, if an external memory has been read or written via the external bus, as in DMA, there will be instances where the data in the cache memory and the data in the main memory do not coincide. Methods used to avoid this problem include a method of clearing or flushing (writing cache content back to memory) the cache memory with respect to the memory area that undergoes the DMA transfer before and after the DMA transfer is performed via the external bus, and a method whereby the memory area that undergoes the DMA transfer is made uncacheable.

An operating system currently in wide use is an embedded operating system having an API (Application Program Interface) that dynamically allocates the memory area used in a DMA transfer. Such an operating system acquires the memory area from a memory manager and controls a cache controller so that the memory area acquired can be made uncacheable. In general, a cache controller has a memory area setting function and is capable of designating a cacheable area and an uncacheable area for each memory area. However, there is a limitation upon the number of registers in the cache controller for the purpose of designating such memory areas. In addition, the larger the number of areas that can be designated, the greater the redundancy of the circuitry. This means that such memory areas cannot be designated without limit.

On the other hand, with application software that utilizes DMA, an improvement in efficiency of DMA transfer is contemplated by providing a plurality of buffers with regard to one DMA channel. For example, during DMA transfer to the first buffer, preparations for a DMA transfer to the second buffer and post-processing are executed.

In view of these circumstances, it is preferred that the number of designatable uncacheable areas be several times larger than the number of channels that can be utilized in such a system. If the number of channels in DMA is large, however, there is an increase in the number of registers for such area control and, hence, there is a great increase in the scale of the circuitry.

Another method is to prepare a large uncacheable area in advance and allocate the uncacheable area by a memory manager that manages this area. In such case, it is necessary that the area of the uncacheable memory is decided statically. This lowers the utilization efficiency of the memory overall.

SUMMARY OF THE INVENTION

Accordingly, a feature of the present invention is to provide an information processing apparatus and method adapted to facilitate area control of a cache.

Another feature of the present invention is to eliminate the above-described drawbacks of the prior art.

It should be noted that not all features of the present invention are described and that combinations of these features also can also constitute the present invention.

According to the present invention, there is provided with an information processing apparatus comprising: a memory circuit configured to allow a CPU to access the same memory areas of a memory using a plurality of different address sets; cache means for performing cache control with one address set of the plurality of different address sets serving as a cacheable address set and another address set of the plurality of different address sets serving as an uncacheable memory address set; and allocating means for, in a case where an acquisition of an area of a prescribed size is requested in the memory, appending a size that is at least twice a line size serving as a cache unit to the prescribed size requested, and allocating a memory area having the resultant size in the memory that is accessible by the uncacheable memory address set.

Further, there is provided with an information processing method executed by an information processing apparatus having a CPU, a memory, a cache memory and a cache controller, the method comprising the steps of: in a case where an acquisition of an area of a prescribed size is requested in the memory, appending a size equivalent to at least two lines serving as a cache unit to the prescribed size requested, and reserving the area in the memory; and allocating the area to an uncacheable memory area of the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will now be described in detail with reference to the accompanying drawings. It should be noted that the embodiment described below does not limit the invention set forth in the claims and that not all of the features described in the embodiment are necessarily essential as means for attaining the objects of the present invention.

Figure 1:
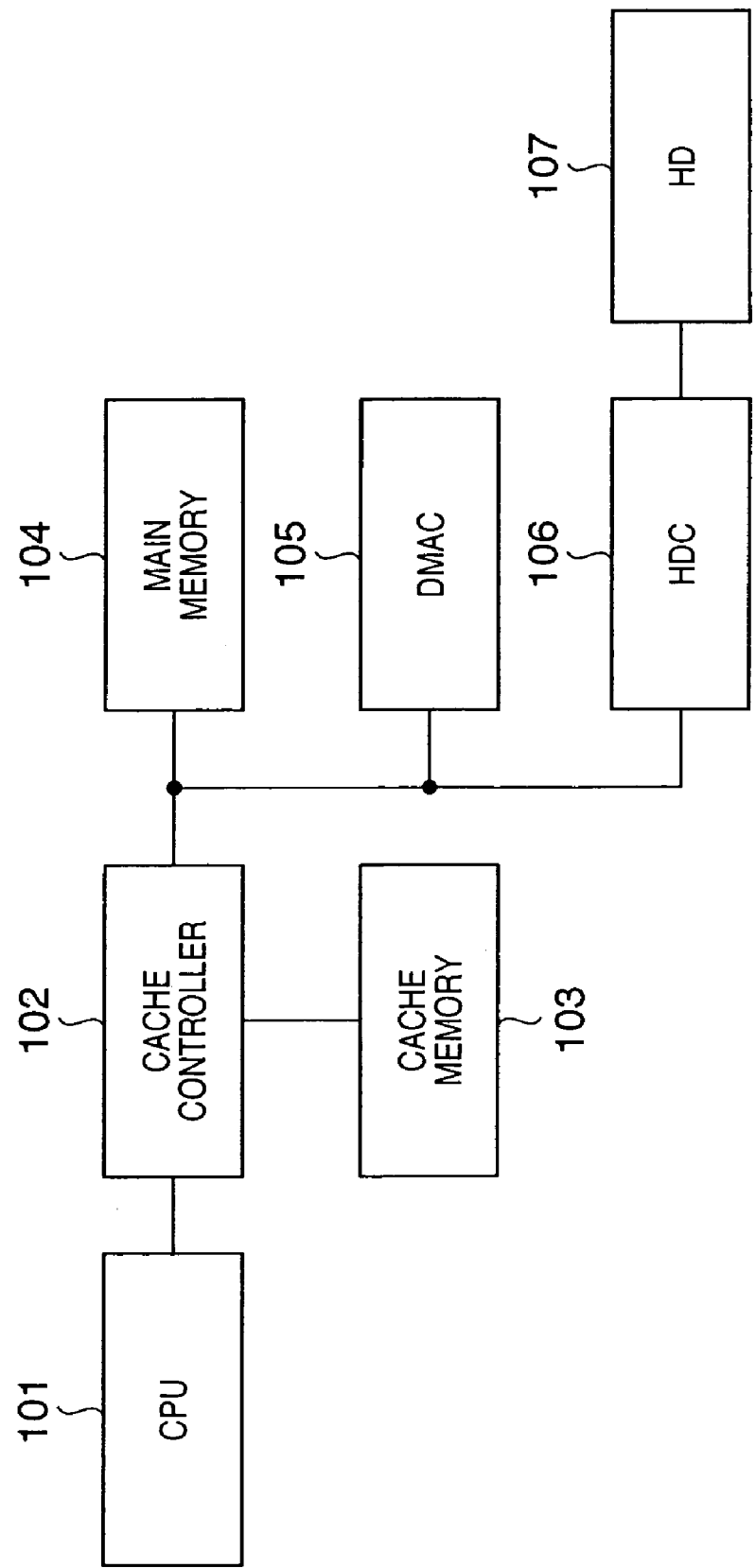
FIG. 1 is a block diagram useful in describing devices associated with a CPU of an information processing apparatus according to an embodiment of the present invention.

FIG. 1 is a diagram useful in describing the hardware associated with a CPU in an information processing apparatus according to an embodiment of the present invention. Components such as input/output units and a monitor are not shown.

As shown in FIG. 1, a CPU 101 controls various operations in accordance with an operating system and application programs stored in a main memory 104. A cache controller 102 implements cache control that employs a cache memory 103. The main memory 104 stores programs executed by the CPU 101 as well as data, etc. A DMAC (Direct Memory Access Controller) 105 is capable of performing a data transfer by DMA between, e.g., a hard disk controller (HDC) 106 and the main memory 104 without the intermediary of the CPU 101. The hard disk (HD) 107 is a large-capacity external memory device. The operating system and various application programs, which have been installed on the hard disk, are loaded in the main memory 104 and executed by the CPU 101. The cache memory 103, which employs a high-speed SRAM, stores a large quantity of data under the control of the cache controller 102, and the cache controller 102 intends to make effective utilization of the cache memory 103 while discarding old data addresses of low frequency of use.

Whereas the cache memory 103 and CPU 101 transfer data in word or byte units, the data transfer between the cache memory 103 and main memory 104 is performed in line units. That is, even in a case where a single bit of data is required, the data of an entire line is exchanged (this is referred to as "line fill") between the cache memory 103 and main memory 104. With a computer having the cache memory 103, therefore, the data transfer between the cache memory 103 and main memory 104 is carried out with the line size (e.g., 256 bits in a case where bus width is 64 bits) serving as the minimum unit of the transfer.

<Shadow Memory>

Figure 2:
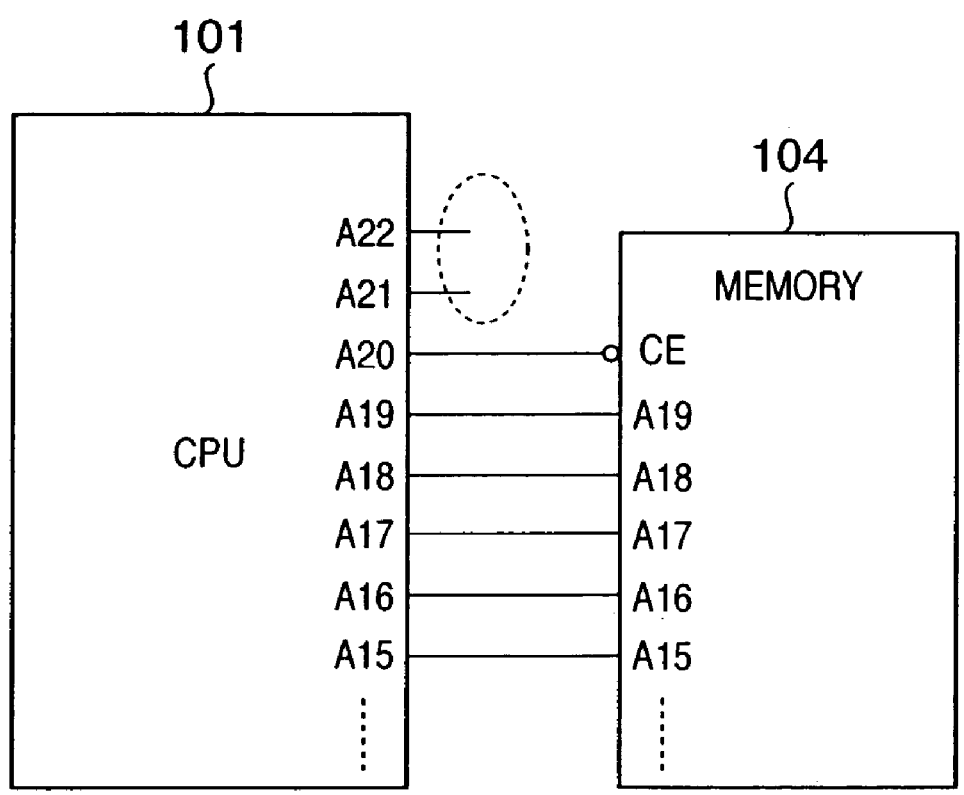
FIG. 2 depicts a diagram useful in describing the connections between a memory and the CPU in the information processing apparatus according to this embodiment.

FIG. 2 depicts a diagram useful in describing the address wiring between the CPU 101 and main memory 104.

It is possible to keep memory space small by not wiring several higher-order bits (address bits A22 and A21 in this example) in the address signal (address bits A22 to A0 in this example) that is asserted by the CPU 101. In FIG. 2, the CPU 101 has a memory space defined by the address bits A0 to A22, namely a memory space from address 0 to address 7xFFFFF, while the main memory 104 has a memory space of 20 bits address (A0 to A19), namely addresses 0 to FFFFF. The address lines of higher-order addresses (address bits A21 and A22) among the memory addresses of the CPU 101 are not connected to the addresses of the main memory 104, and address A20 is connected to CE (Chip Enable) of main memory 104.

Figure 3:
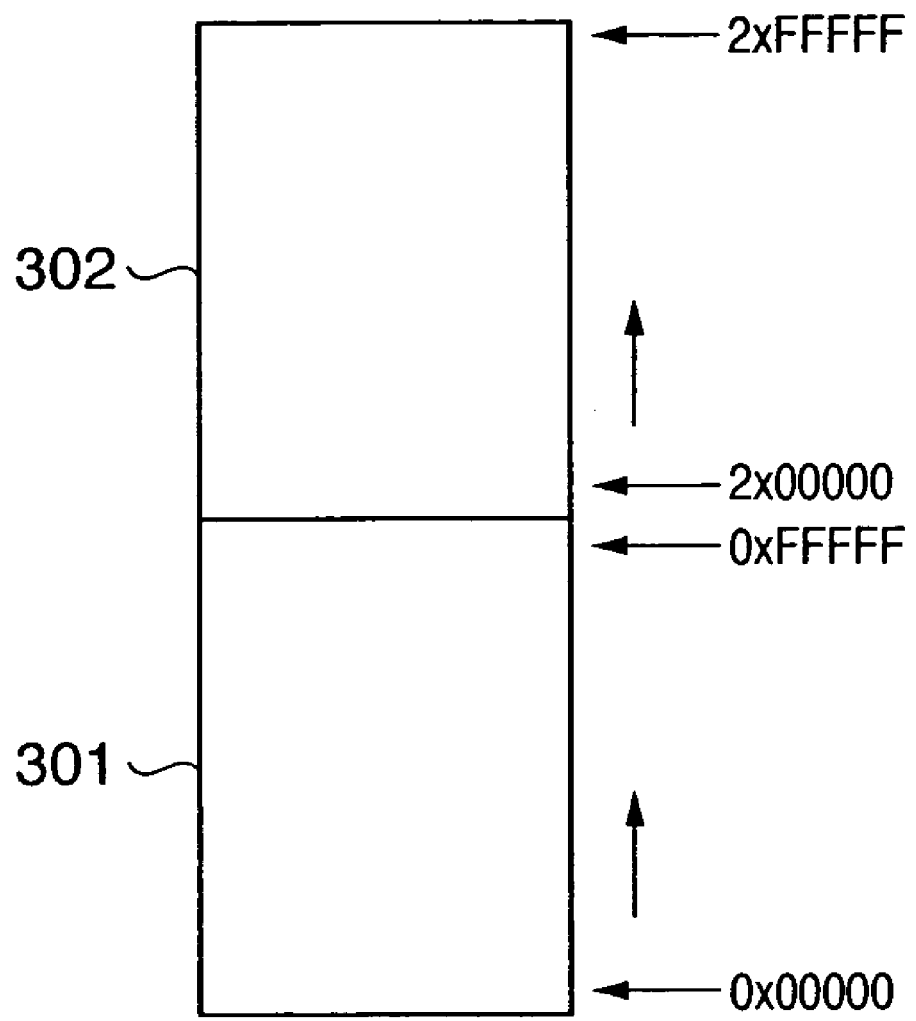
FIG. 3 depicts a diagram useful in describing the memory map of a main memory according to this embodiment.

FIG. 3 depicts a diagram useful in describing the memory map of the CPU 101 in the case of the wiring shown in FIG. 2.

As viewed from the CPU 101, the content 301 from address 0 to address 0x0FFFFF of main memory 104 is identical with the content of an area 302. For example, the CPU 101 can also view the contents of the area 301 as the memory area 302 from address 0x200000 to address 0x2FFFFF. In this case, addresses from 0x200000 to 0x2FFFFF are referred to as the shadow of addresses 0 to 0xFFFFF.

In the information processing apparatus according to this embodiment, the memory area 302 on the shadow side is utilized upon being made uncacheable. For example, the memory area 301 from address 0 to address 0xFFFFF is made cacheable and the memory area 302 from address 0x200000 to address 0x2FFFFF is made uncacheable. If the setting of the uncacheable area is applied to the cache controller 102, then from this point onward the cache controller 102 will exercise control in such a manner that the cache operation is not executed when this memory area 302 is accessed.

<Utilization of General-Purpose Memory Manager>

In the information processing apparatus according to this embodiment, a general-purpose memory manager is utilized to allocate the uncacheable memory area 302. The general-purpose memory manager is provided as a malloc function, which is a standard function of C language, by way of example. A memory area that has been acquired by the malloc function is set as the cacheable memory area 301. Accordingly, undecoded address bits in the address of the memory area are altered and made the address of the uncacheable memory area 302, and the results are returned to the client program, namely the program that executed the malloc function. For example, a memory area that has been allocated in the cacheable memory area 301 from address 0x01000 to address 0x014FF is dedicated to the uncacheable memory area 302 from address 0x201000 to address 0x2014FF by asserting "1" in the address bit A21 as viewed from the CPU 101.

Next, in a case where the uncacheable memory area 302 is released, the client program conversely alters undecoded bits (asserting "0" in the address bit A21 in the above-described example) in the address of the main memory 104 and makes a change to the area (address 0x01000 to address 0x014FF) of the cacheable memory area 301. Next, a free function is used to instruct the memory manager to release the memory area that has been reserved.

By thus utilizing shadow memory, it is possible to generate cacheable memory areas without limit relying upon no hardware-depended area designating registers.

<Clear>

There is the possibility that the memory area (address 0x01000 to address 0x014FF of cacheable memory area 301 in the example above) that was allocated to the uncacheable memory area 302 (address 0x201000 to address 0x2014FF) in the manner described above was being utilized as a cacheable memory area, until just prior to its allocation to the uncacheable memory area. If the cache is swept out after it starts being used as the uncacheable memory in such case, then the content of a memory area of the main memory 104 will be destroyed by the content that was cached in the uncacheable memory up to that point. Accordingly, it is necessary that the information that has been cached in a cacheable memory area is cleared at least before the cacheable memory area is allocated as uncacheable memory area.

<Line Size>

The uncacheable memory area that has thus been allocated is such that the addresses peripheral to the uncacheable memory area are utilized as address of the cacheable memory area. In general, a cache is managed by a LRU (Lease Recent Used) algorithm in line units (the units of caching, e.g., one line of 256 bytes). A general-purpose memory manager, however, allocates memory areas irrespective of the line size in the cache.

This will be described in greater detail with reference to FIG. 4.

Figure 4:
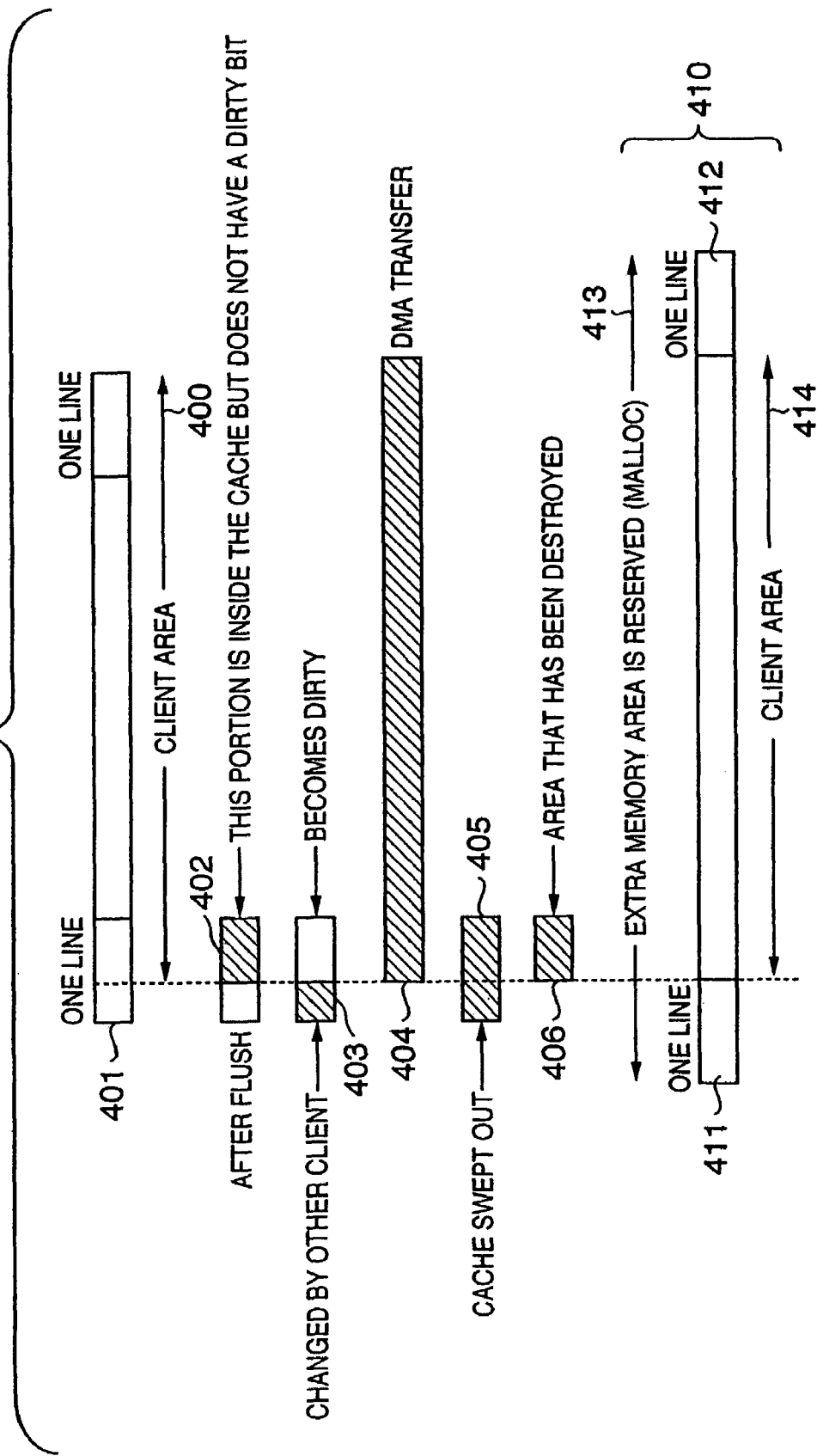
FIG. 4 depicts a diagram useful in describing destruction of data in a memory ascribable to sharing of a line in the prior art, as well as the reserving of a memory use area in this embodiment.

In FIG. 4, a memory area 400 has been allocated to a client program. However, since a general-purpose memory manager that allocates memory areas irrespective of the line size is being utilized, a part (403) of a line indicated at 401 is being shared with the outside of the client area 400. When memory area has been delivered to the client program, a portion indicated at 402 of the line 401 has not yet been written by the client program. If another client program that is sharing the portion indicated at 403 of line 401 with the client area 400 subsequently rewrites the area 403, then a dirty bit will be set with respect to the client area 400. Next, the client program transfers by DMA transfer and rewrites all data 404 of the client area 400. At this point in time the memory area as seen from the client area 400 has not been destroyed. When execution of the system program proceeds and the content of the line 401 is swept out of the cache by the LRU algorithm in line units, the entirety of the line 401 is written out, as indicated at 405. However, here an area 406 is overwritten by the DMA transfer data indicated at 404 and the content of line 401 is destroyed.

Accordingly, in this embodiment, both ends of a client program area 414 are provided with unused areas 411, 412 each of which is equivalent to the line size, as indicated at 410. As a result, the content of the client program area 414 is prevented from being destroyed even though a general-purpose memory manager is utilized, because the areas 411 and 412 are also not used by other client program so that the areas 411 and 412 become buffer areas.

What has been described is the portion indicated at 410 in FIG. 4. Reference numerals 411 and 412 indicate unused areas appended to both ends in order to prevent destruction of data of the client program area. Each of the unused areas 411 and 412 has a data area of at least one line.

Thus, according to this embodiment, when an uncacheable area is requested from a client program, a memory area is acquired from the general-purpose memory manager at a size (indicated at 413) obtained by adding a size equivalent to the size of at least two lines to the size of the requested area, and only safe area information indicated at 414 is delivered to the client program as a memory area for use. The memory area usable by the client in this case is the area indicated at 414.

Figure 5:
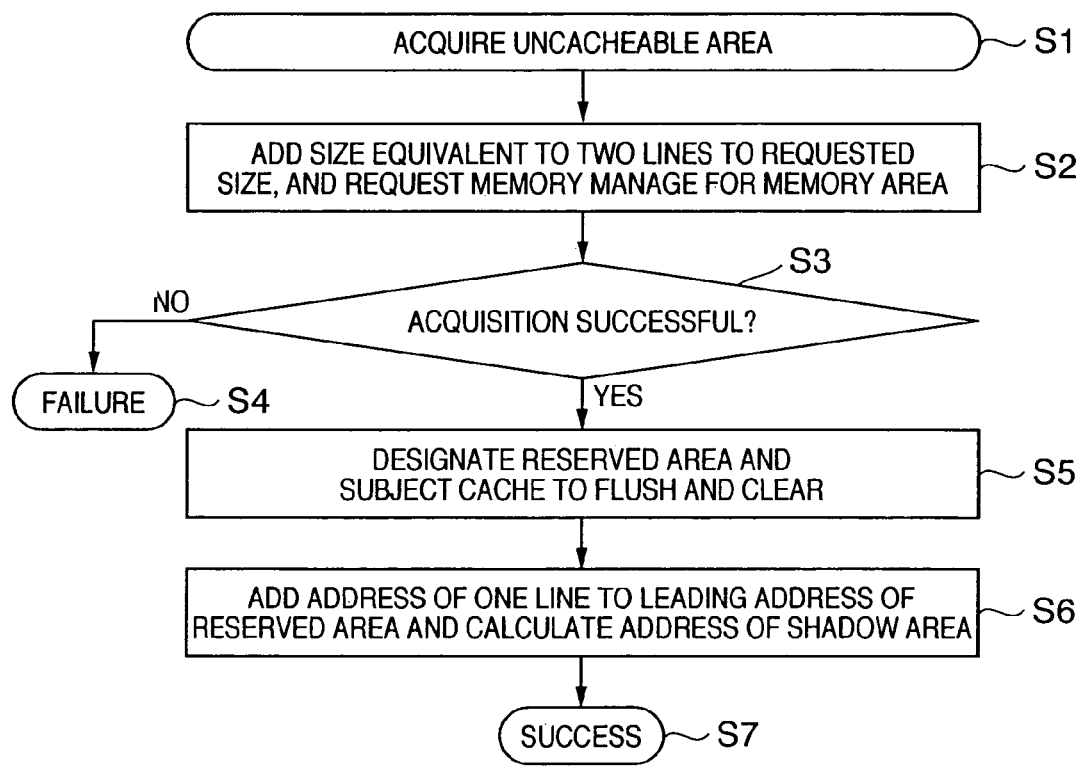
FIG. 5 is a flowchart useful in describing processing for reserving an uncacheable area in the information processing apparatus according to the embodiment of the present invention.

FIG. 5 is a flowchart useful in describing processing executed in the information processing apparatus according to this embodiment. This embodiment will be described based upon an example of memory management that allocates an uncacheable memory area dynamically. This program is called from a user program and allocates an uncacheable memory area by an API named "cacheDmaMalloc( )", by way of example. The program is contained in the operating system that has been installed in the hard disk 107 and is executed upon being loaded into the main memory 104 when the operating system is loaded. This program may be supplied also as an installable execution command to an already existing operating system.

First, at step S1 in FIG. 5, the reserving of a cacheable memory area is started through the API. Normally the memory size requested by the user is accepted as a parameter in the process of step S1. Next, at step S2, a memory size obtained by appending a size equivalent to at least two lines of the cache to the memory size requested by the user program is calculated, and an ordinary memory manager is requested for a memory area of the calculated size. Here the memory manager used is a C-language interface and corresponds to a malloc( ) function; it is not a special memory manager. Next, at step S3, the result obtained at step S2 is investigated and it is determined whether the reserving of memory area succeeded or not. In the event of failure, control proceeds to step S4, where this service is terminated. An example of failure would be a case where the memory area to be allocated no longer exists. In the case of the malloc( ) function, a NULL code is returned if allocation of the memory area fails. Accordingly, a value such as NULL, which similarly indicates failure, is returned also at step S4.

If it is found at step S3 that acquisition of the memory area has succeeded, on the other hand, then control proceeds to step S5. Here the reserved memory area is subjected to the above-described flush and then clear using the cache controller 102. At this time the memory area that has been acquired is such that a memory area that was unused when viewed from the memory manager has been allocated. However, there is also an instance where the memory area was being used by a user program just prior to the present time. Therefore, in a case where data that was written to the memory area when the memory area was in use still remains inside the cache, there is a possibility that valid data will subsequently be overwritten and destroyed by the remained data during sweep-out of the cache. The cache, therefore, is cleared. The reason for performing the flush prior to the clearing is that there is a possibility that a peripheral area that is sharing a line with the reserved area will possess valid data in the cache, the valid data is not yet written in the main memory 104.

If acquisition of the memory area is thus completed at step S5, control proceeds to step S6. Here an address obtained by adding an address of the equivalent of one line to the leading address of the reserved memory area is calculated and so is the leading address of a shadow area (for example, 302 in FIG. 3). This is because the memory area actually used by the client program is one in which an address of one line at the beginning and an address of one line at the end have been excluded, as described above with reference to FIG. 4. A case where the line size is 256 bytes, as mentioned above, and the memory map is as shown in FIG. 3 will be described by way of example. If we assume that the address of the reserved memory area is "0x00004010", then "0x00004010"+"0x100 (line size)"+"0x00200000"→"0x00204110" is the address delivered to the user. The calculated address of the memory area is returned to the user program and processing ends at step S7.

Figure 6:
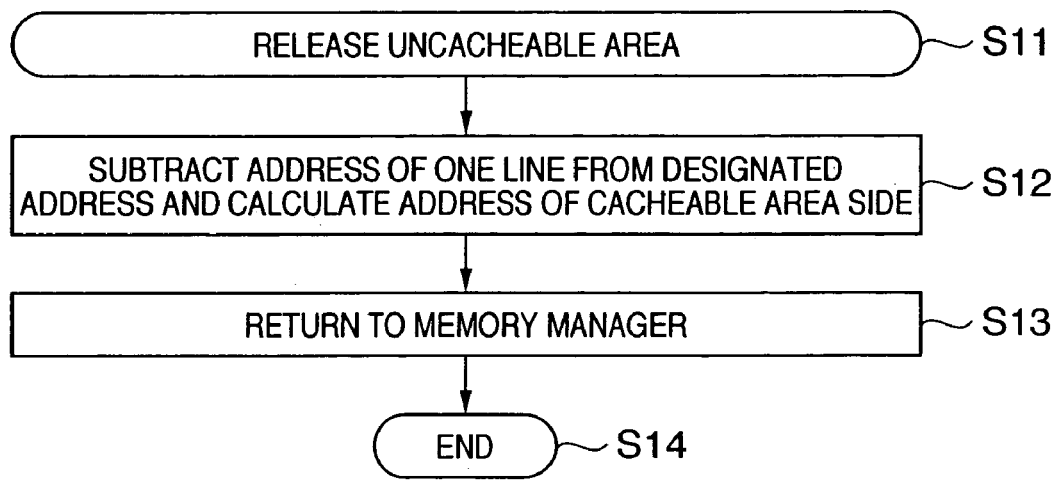
FIG. 6 is a flowchart useful in describing processing for releasing an uncacheable area in the information processing apparatus according to the embodiment of the present invention.

FIG. 6 is a flowchart illustrating processing through which an uncacheable memory area that has been acquired by a client program is returned to the operating system according to this embodiment. For example, this is supplied by an API named "cacheDmaFree ( )". This program also is similarly included in the operating system that has been installed in the hard disk 107 and is executed upon being loaded into the main memory 104 when the operating system is loaded. This program may be supplied also as an installable execution command to an already existing operating system.

The program is called from the client program at step S11. At this time the leading address of the memory area that was allocated to the client program is accepted as a parameter. An address of the equivalent of one line is subtracted from the designated address to obtain the address on the side of the cacheable memory at step S12. For instance, in accordance with the example described above with reference to FIG. 3, we have (0x00204110&0xFFFDFFFFF)−0x100 (line size)→0x00004010. Since the value obtained here is an address acquired from the memory manager by the malloc( ) function, it is returned to the memory manager by a free( ) function at step S13. This service is then terminated at step S14.

In accordance with this embodiment, as described above, the setting of cacheable areas can be performed without being limited by the number of registers, etc.

Further, in accordance with this embodiment, the reserving of a memory area and cache control can be performed utilizing a general-purpose memory manager.

OTHER EMBODIMENTS

A general-purpose memory manager is used in the embodiment described above. However, there is also a method in which the unused areas of one line each before and after are eliminated by preparing a memory manager that is aware of cache line size and so arranging it that a memory area that shares a line with a user area cannot be formed.

Further, in the embodiment described above, the circuit implementation described is one in which a full address is not decoded. However, a shadow in which the same memory area is accessed by another memory address may be constructed using means such as an MMU (Memory Management Unit).

The objects of the invention are attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, the present invention covers a case where an operating system or the like running on the computer performs a part of or the entire process based upon the instructions of program codes and implements the functions according to the embodiment by such processing.

Furthermore, the present invention further covers a case where, after the program codes read from the storage medium are written in a function expansion board inserted into the computer or in a memory provided in a function expansion unit connected to the computer, a CPU or the like with which the function expansion board or function expansion unit is equipped performs a part of or the entire process in accordance with the designation of program codes and implements the function of the above embodiment.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-025349 filed on Feb. 2, 2004, which is hereby incorporated by reference herein.

What is claimed is:

1. An information processing apparatus comprising:
a memory circuit configured to allow a CPU to access the same memory areas of a memory using a plurality of different address sets;
cache means for performing cache control with one address set of the plurality of different address sets serving as a cacheable address set and another address set of the plurality of different address sets serving as an uncacheable memory address set;
allocating means for, in a case where an acquisition of a first area of a prescribed size in the memory is requested by a client, respectively appending second areas to both ends of the first area, wherein each second area is a size of at least a line size saving as a cache unit, wherein the second areas are unused and specifically are not provided to the client and are not used by another client, and wherein the presence of the second areas at both respective ends of the first area prevents data in the first area from being destroyed by an access of the other client and DMA transfer of the data in the first area, and said allocating means further for allocating the first area and the second areas in the memory that is accessible byte uncacheable memory address set; and
a DMA controller configured to perform the DMA transfer of the data in the first area of the memory.

2. The apparatus according to claim 1, further comprising means for applying cache flush and clear to the first area that has been reserved in the memory.

3. An information processing method executed by an information processing apparatus having a CPU, a memory, a cache memory and a cache controller, said method comprising the steps of:
appending, in a case where an acquisition of a first area of a prescribed size in the memory is requested by a client second areas to both ends of the first area, respectively, wherein each second area has a size of at least a line size serving as a cache unit, wherein the second areas are unused and specifically are not provided to the client and are not used by another client, and wherein the presence of the second areas at both respective ends of the first area prevents the data in the first area from being destroyed by an access of the other client and DMA transfer of the data in the first area;
allocating the first area and the second areas to an uncacheable memory area of the memory; and
performing DMA transfer of the data in the first area-of the memory.

4. The method according to claim 3, further comprising a step of applying cache flush and clear to the first area that has been reserved in the memory.

5. A computer-executable program stored on a computer-readable medium, for executing the information processing method set forth in claim 3.

6. A computer-readable storage medium storing the program set forth in claim 5.

* * * * *